October 22, 1913.

DRAWING 3,815

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK

UNITED STATES PATENT OFFICE.

JEDEDIAH PRESCOTT, OF MEMPHIS, TENNESSEE.

COTTON-PRESS.

Specification of Letters Patent No. 3,815, dated November 9, 1844.

*To all whom it may concern:*

Be it known that I, JEDEDIAH PRESCOTT, of the town of Memphis, in the county of Shelby and State of Tennessee, have invented a new and useful Improvement in Presses for Pressing Cotton and other Substances, called "The Samson Railroad Roller Cotton-Press," which is described as follows, reference being had to the annexed drawings of the same, making part of this specification.

Figure 1 is a side elevation of the machine in a position to tie the bale, it having been pressed and the doors opened. Fig. 2 is a vertical transverse section, showing the box packer, ropes and windlass.

Similar letters refer to corresponding parts.

The frame F of this machine is made different from others, and as it may be varied in its form, dimensions, proportions, and materials, to suit the views of the constructor and to be properly adapted for containing and supporting the several parts to be arranged therein and as no claim will be made to its construction, a more particular description need not be given.

The main improvements consist in the combination, and arrangement of the parts for pressing the cotton into a bale, the box for facilitating the operation of forming the bale and having it tied and discharged, and the apparatus for tying the bale, and packing the cotton.

The follower or platen R′ for pressing the cotton upward against the packer A, when secured in a permanent position, is attached by bolts or other suitable fastenings to the ends of two parallel levers standing in an inclined position, changeable in position as the platen rises and falls, having their lower ends connected by bolts, or other suitable fastenings to a longitudinal horizontal carriage R² placed upon the peripheries of parallel transverse rollers S² which are arranged on the top of a large horizontal permanent way T framed into the sills of the frame. A rope or chain $a$ for drawing forward the carriage when the levers are to be made to approximate to a vertical line, and the platen is to be raised, is made fast to the lower end of one of the levers, which is extended below the carriage, by one of its ends, while its other end is carried over the pulley $b$ and under the pulley $c$, and around the capstan W which is used for moving said carriage.

The ends $d$ of the box for holding the cotton to be pressed are let into grooves made in the upper surface of the platen, so that when the bale shall have been pressed said ends of the box can be raised from the platen by means of two small levers Z, turning on horizontal axles, or fulcra let into the platen outside the box, the short ends of said levers being introduced into mortises or cavities, made in the ends of the box while the longer ends of the levers, as the platen rises, are caused to strike against stops, projecting from the frame, and the platen continuing to rise, the short ends of the levers are made to lift the ends of the box from the grooves in the platen, and by the elasticity of the cotton said ends are forced from the bale. In Fig. 1 these ends are represented in the grooves of the platen. In Fig. 2, they are not represented.

The sides of the box lettered L turn on axles and are represented as thrown open in Fig. 1 to allow of access to the bale to insert the ropes; and in Fig. 2 they are represented as closed, the space $e$ between them being that in which the cotton is pressed. The sides of the box are held firmly, in the position required, during the operation of pressing, by means of two horizontal bars X, which extend along their outside, and rest on the frame, and are connected together, near their ends by two notched bars $x$. When the levers R are near a vertical position, and during the ascent of the platen, the notched bars are disengaged from the bars X by means of a pin $p$ projecting from each end piece, coming in contact with their under side and lifting them above said horizontal bars. The sides are then thrown open by the pressure of the cotton.

The packer A during the operation of pressing is keyed and held fast by the bar Y—it then corresponds with the common head block against which the cotton is pressed. In Fig. 1 it is represented as keyed fast by horizontal bars Y. In Fig. 2 it is represented as unkeyed, and in a position to be used as a packer, for packing the cotton downward into the box preparatory to the operation of pressing it upward into a bale.

In order to adapt the head block to be used as a packer it must be constructed differently from any other in use; it must be combined with a separate frame A² which, when the head block is used as a packer, must be made to move up and down in the main frame F between guides D let into the frame F, being forced down by a cord $f$ whose lower end is made fast to the main frame, and whose opposite end is carried over the pulley B and down to the windlass, and being again raised by means of a cord $g$, which is attached to the lower end of the packer and carried over a pulley $c$, and down to the windlass J. By drawing the cord $f$, the packer is forced down upon the cotton, previously thrown loosely in the box, by which the operation of tramping is dispensed with. Then by turning the windlass J, the packer is raised out of the way, for another supply of cotton, which is treated in a similar manner. The same windlass is also used for drawing the ropes in tying the bale by first passing the rope around the bale, arranging the slip-knot, and then conveying the other end of the rope, to the windlass, around which it is coiled twice or thrice, and the windlass turned which draws the tie as close as may be required, without injury to the hands of the operator. The bale is then discharged—the sides and ends of the box replaced—the capstan liberated—when the weight of the platen and the inclined position of the levers, will cause the carriage to run back over the rollers—without the application of any power. The object of placing the carriage to which the levers are attached upon the peripheries of large parallel rollers turning on a way or horizontal plane is to reduce the power required to elevate the levers and platen, by reducing the friction experienced in the use of small wheels, or pulleys, turning on axles in the ends of levers, as in other machines, and also in simplifying and cheapening the construction of the machinery and rendering it more easy to be put in order, when out of order from any cause.

What I claim as my invention and which I desire to secure by Letters Patent is—

1. The combination of the inclined parallel levers R R with the horizonal carriage $R^2$ and rollers $S^2$, arranged and operated in the manner and for the purpose above set forth.

2. The arrangement of the ends $d$ of the box in grooves in the platen, so as to rise and fall with the platen, and be liberated from it at the termination of the pressing.

3. The combination of the levers Z, with the platen, arranged, and operated in the manner, and for the purpose above set forth.

4. The manner of disengaging the bars from the box, by means of the pins $p$, upon the ascending ends of the box, in order to throw open the sides of the box, to tie and remove the bale.

JEDEDIAH PRESCOTT.

Witnesses:
EDWIN MAHER,
JOHN SMITH HANNA.